(12) United States Patent
Sopcic et al.

(10) Patent No.: US 9,316,114 B2
(45) Date of Patent: Apr. 19, 2016

(54) RECOVERING SPEED IN DRIVELINE ASSEMBLY

(71) Applicant: General Electric Company, Schenectady, NY (US)

(72) Inventors: Paige Marie Sopcic, Greenville, SC (US); Justin Aaron Allen, Greenville, SC (US); Jason Dean Fuller, Simpsonville, SC (US); Daniel Richard Waugh, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 14/268,295

(22) Filed: May 2, 2014

(65) Prior Publication Data

US 2015/0315928 A1    Nov. 5, 2015

(51) Int. Cl.
*B60W 10/06* (2006.01)
*B60W 10/08* (2006.01)
*F01D 17/20* (2006.01)
*F01D 17/06* (2006.01)

(52) U.S. Cl.
CPC ............... *F01D 17/20* (2013.01); *F01D 17/06* (2013.01)

(58) Field of Classification Search
None
See application file for complete search history.

(56) References Cited

U.S. PATENT DOCUMENTS

| | | | |
|---|---|---|---|
| 4,699,021 A * | 10/1987 | Waddington | B62D 11/10 180/6.44 |
| 5,879,133 A | 3/1999 | Mirsky et al. | |
| 8,191,410 B2 | 6/2012 | Hansen et al. | |
| 2010/0287948 A1 | 11/2010 | Draper et al. | |
| 2011/0288731 A1* | 11/2011 | Minto | F02C 9/20 701/54 |
| 2013/0019606 A1 | 1/2013 | McLeister et al. | |
| 2013/0061601 A1* | 3/2013 | Fuller | F02C 7/268 60/787 |

* cited by examiner

*Primary Examiner* — Edwin A Young
(74) *Attorney, Agent, or Firm* — Ernest G. Cusick; Hoffman Warnick LLC

(57) ABSTRACT

Aspects of the disclosure include apparatuses and program products for recovering speed in a driveline assembly. An apparatus in one embodiment may include: a sensor measuring a shaft speed of a rotatable shaft within a driveline assembly, wherein the driveline assembly includes: a load coupled to the rotatable shaft, a primary power source coupled to the load through the rotatable shaft to deliver a first power output to the load, and a secondary power source coupled to the load through the rotatable shaft to deliver a second power output to the load, wherein the second power output is less than the first power output; and a controller in communication with the secondary power source and the sensor, wherein the controller increases the second power output in response to the shaft speed being less than a minimum speed threshold.

19 Claims, 3 Drawing Sheets

RECOVERING SPEED IN DRIVELINE ASSEMBLY

BACKGROUND OF THE INVENTION

The disclosure relates generally to controlling driveline assemblies. More particularly, the disclosure relates to apparatuses and program products for recovering the lost speed of a rotatable shaft in a driveline assembly.

Combustion-based power sources such as gas turbine assemblies can generate mechanical energy by combusting a source of fuel intermixed with compressed air. These combustion reactions create mechanical power for driving a load component attached to the combustion-based power source (e.g., by a rotatable shaft). The effectiveness of combustion-based power sources and similar power generation devices can depend on their implementation, environment, and/or other factors such as manufacturing quality and state of operation (e.g., transient state or steady state). In many cases, these devices are tested at close to their maximum or expected load conditions to predict their performance (e.g., fuel intake, speed, power output) in different situations.

One assembly for testing or implementing a power generation device is a driveline assembly. Driveline assemblies can include a primary power source, such as a combustion-based power source, which is coupled to a load component and a secondary power source through a rotatable shaft. The secondary power source can compensate for at least some of the power needed to drive the load during transient (e.g., startup and shut down) and steady-state testing conditions.

BRIEF DESCRIPTION OF THE INVENTION

Apparatuses and program products for recovering speed in a driveline assembly are disclosed. Although embodiments of the disclosure are discussed by example herein relative to driveline assemblies which include motors and gas turbines as power sources for driving a load, it is understood that embodiments of the present disclosure may be applied to other situations.

A first aspect of the invention provides an apparatus. The apparatus can include a sensor measuring a shaft speed of a rotatable shaft within a driveline assembly, wherein the driveline assembly includes: a load coupled to the rotatable shaft, a primary power source coupled to the load through the rotatable shaft to deliver a first power output to the load, and a secondary power source coupled to the load through the rotatable shaft to deliver a second power output to the load, wherein the second power output is less than the first power output; and a controller in communication with the secondary power source and the sensor, wherein the controller increases the second power output in response to the shaft speed being less than a minimum speed threshold.

A second aspect of the invention provides a program product stored on a computer readable storage medium. The program product can be operative to recover speed in a driveline assembly when executed and include program code for: comparing a shaft speed of a rotatable shaft of the driveline assembly with a minimum speed threshold, wherein the rotatable shaft mechanically couples a load to a primary power source and a secondary power source, the primary power source delivering a first power output to the load and the secondary power source delivering a second power output to the load less than the first power output; and increasing a set point of the secondary power source in response to the shaft speed being less than the minimum speed threshold.

A third aspect of the invention provides an apparatus including: a motor coupled to a torque converter, wherein the torque converter couples the motor to a load and a gas turbine through a rotatable shaft, and multiplies a power output of the motor to the rotatable shaft by a conversion factor; and a controller component of the motor in communication with the torque converter, wherein the controller component increases the conversion factor of the torque converter in response to a shaft speed of the rotatable shaft being less than a minimum speed threshold.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
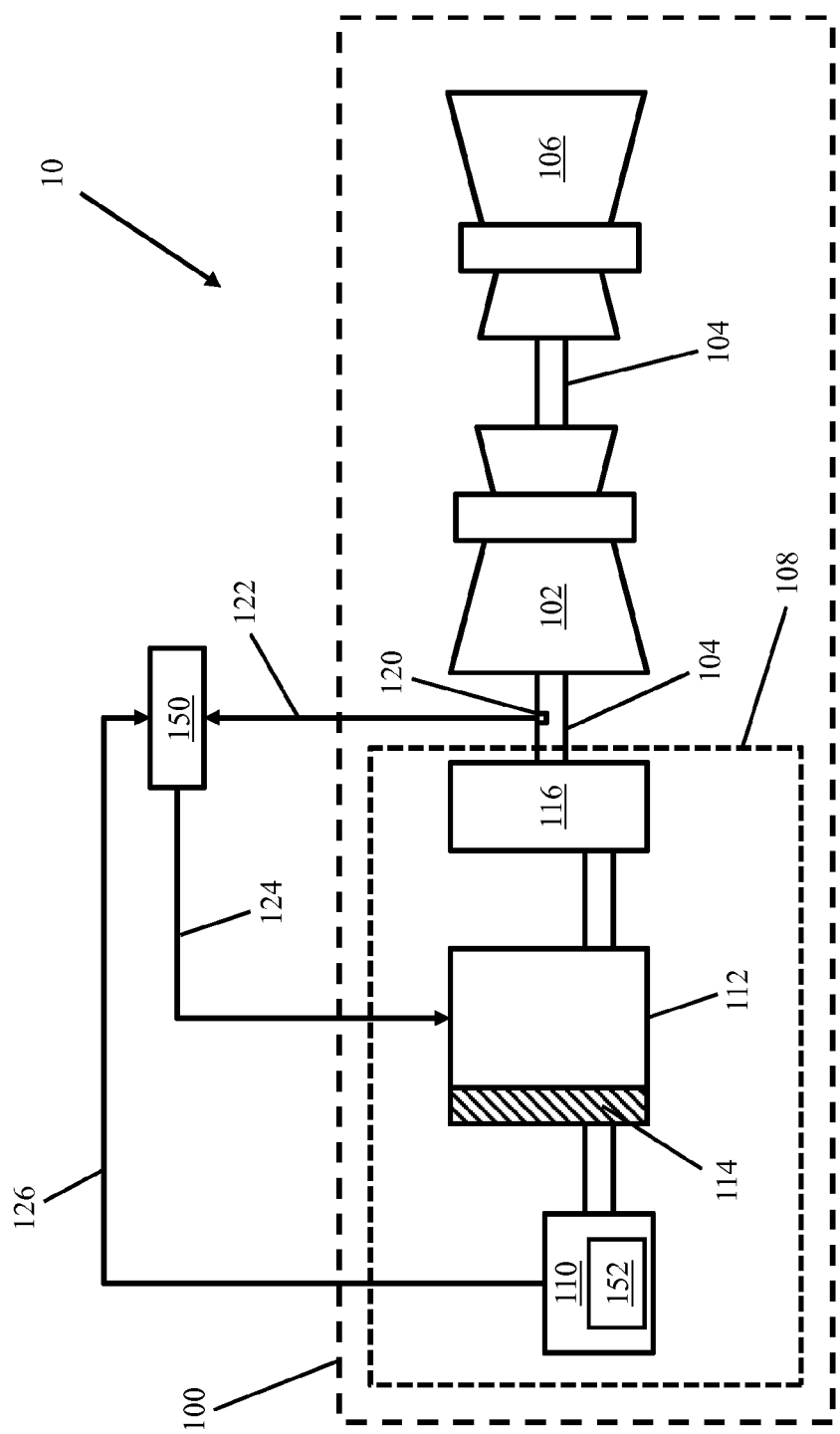
FIG. 1 shows a schematic depiction of a driveline assembly according to an embodiment of the present disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally to driveline assemblies with combustion-based power sources, such as gas turbines. More particularly, as discussed herein, aspects of the invention relate to recovering shaft speed in a driveline assembly.

Referring to FIG. 1, a schematic illustration of an apparatus 10 according to an embodiment of the present disclosure is shown. Apparatus 10 can include and/or interact with components of a driveline assembly 100. Other embodiments of the present disclosure can integrate one or more components of apparatus 10 directly into one or more components of driveline assembly 100. Driveline assembly 100 can include a load 102 coupled to a rotatable shaft 104. Load 102 can include any type of mechanical device which is powered at least in part with mechanical energy from rotatable shaft 104, and more specifically can be in the form of a generator or compressor coupled to a turbine system. In an even more specific embodiment, load 102 can be a compressor component of a primary power source 106 in the form of a gas turbine. Rotatable shaft 104 can mechanically couple load 102 to primary power source 106. Primary power source 106 can include, e.g., a combustion-based power source such as an internal combustion engine or gas turbine configured to generate a first power output delivered to rotatable shaft 104. A gas turbine is a type of internal combustion engine where compressed air reacts with a fuel source to generate a stream of hot air. The stream of hot air enters a turbine section and flows against several turbine blades to impart work against rotatable shaft 104. Rotatable shaft 104 can rotate in response to the stream of hot air, thereby creating mechanical energy for powering one or more loads 102 coupled to rotatable shaft 104. Other forms of combustion-based power sources used as primary power source 106 may operate on similar principles and with similar parts.

Rotatable shaft 104 can couple a secondary power source 108 to load 102. Secondary power source 108 can be in the form of another power-generating component or machine, such as a gasoline motor or an electric motor. Secondary power source 108 can deliver a second power output to load 102 that is less than primary power output 106, and more specifically can complement a changing power output from primary power source 106. Embodiments of the present disclosure can manipulate secondary power source 108 to recover lost speed of rotatable shaft 104 as driveline assembly 100 operates.

The components of secondary power source 108 in a particular embodiment are discussed herein by way of example. Secondary power source 108 can include a motor 110 coupled (e.g., by a mechanical and/or fluid coupling) to a torque converter 112. Torque converter 112 can multiply rotational energy yielded from motor 110 into a different amount of rotational energy imparted to rotatable shaft 104. For example, torque converter 112 can vary the torque generated with motor 110 through a range of output values. Torque converter 112 can be adjusted to deliver a larger or smaller power conversion multiple (also known as a "conversion factor") for additional control of driveline assembly 100, which can generally be any value between zero and one (i.e., 0≤(conversion factor)≤1.000). A conversion factor of one will allow secondary power source 108 to deliver full power to rotatable shaft 104, while a conversion factor of zero will cause secondary power source 108 to deliver no power to rotatable shaft 104. A particular conversion factor can be expressed as a decimal variable with several significant figures, e.g., in tenth, hundredths, thousandths, millionths, etc. One method for adjusting the conversion factor of torque converter 112 can include opening (to increase the conversion factor) or closing (to decrease the conversion factor) several guide vanes 114 positioned within torque converter 112. If desired, the torque yielded to rotatable shaft 104 from torque converter 112 can be further multiplied with a gearbox 116 mechanically coupled between torque converter 112 and rotatable shaft 104. Gearbox 116 can include a group of components (e.g., interconnected gears) which form a particular gear ratio for converting particular output forces from torque converter 112 into an even larger output torque for rotatable shaft 104.

A sensor 120 can measure the shaft speed of rotatable shaft 104. Sensor 120 can be in the form of, without limitation, an optical sensor, an electric sensor, a magnetic sensor, a mechanically actuated switch, a laser sensor, a capacitive sensor, an inductive sensor, a camera, and/or and other currently known or later developed device capable of tracking rotatable shaft 104 and/or any markers thereon to measure or derive values of rotational speed. Sensor 120 can be in communication with a controller 150 through a data coupling 122, and secondary power source 108 in turn can communicate with controller 150 through data couplings 124, 126. In the embodiment of FIG. 1, data coupling 124 can couple controller 150 to torque converter 112 and data coupling 126 can couple controller 150 to motor 110.

Controller 150, by referring to measurements of rotational speed from sensor 120 and desired values of rotational speed, can adjust secondary power source 108 to recover speed losses in rotatable shaft 104. For example, load 102 exceeding the maximum load capacity of primary power source 106 may decelerate rotatable shaft 104 to a lower speed than is desired for driveline assembly 100. In extreme situations, driveline assembly 100 may shut down altogether from an increased load 102. Controller 150 may include a minimum speed threshold stored as data in a memory or data storage component thereof. Controller 150, upon measuring a shaft speed for rotatable shaft 104 that is below the minimum speed threshold, can increase the power output of secondary power source 108 until the shaft speed reaches the minimum speed threshold. It is further understood that controller 150 can increase the power output of secondary power source 108 in response to other unforeseen situations, e.g., disasters or extreme environmental conditions affecting driveline assembly 100, load 102, and/or primary power source 106.

In a secondary power source 108 which includes motor 110, controller 150 can perform other actions for increasing the speed of rotatable shaft 104. Motor 110, in some embodiments, can be equipped with a motor control component (controller component) 152 which includes a processing unit and hardware or software for executing a motor control algorithm. The motor control algorithm can be in the form of a PID (product, integral, derivative) loop. A PID loop refers to a control technique for adjusting an output variable by alternatively decreasing and increasing an input variable until a desired value (referred to herein as a set point) is reached. Embodiments of controller 150 can receive a power output measurement (which may be expressed in Watts, horsepower, etc.) and the current set point for motor 110 via data coupling 126. To increase the power output of motor 110, controller component 152 can be in communication with controller 150, and can modify (i.e., increase or decrease) the set point of motor 110 when rotatable shaft 104 drops below a minimum speed threshold. Where secondary power source 108 includes torque converter 112, controller 150 or controller component 152 can adjust the conversion factor of torque converter 112 by communicating, e.g., through data coupling 124, instructions to open or close guide vanes 114. Opening or closing guide vanes 114 can be an additional or alternative action for adjusting the set point of motor 110. Although controller 150 and controller component 152 are shown in FIG. 1 and described by example herein as being different parts, it is understood that controller 150 and controller 152 can be embodied as a single component external to motor 110 or contained entirely therein.

Controller 150 can manipulate secondary power source 108 to recover shaft speed for rotatable shaft 104 even without the speed of rotatable shaft 104 being below the minimum speed threshold. In one alternative embodiment, a shaft speed set point and deceleration threshold can be communicated to controller 150 and/or stored therein. The shaft speed set point can represent an optimum speed for rotatable shaft 104 that is greater than the current speed. Rotatable shaft 104 may drop below the shaft speed set point and remain above a minimum speed threshold, while decelerating at a greater rate than a predetermined deceleration threshold. In this case, controller 150 can increase the power output of secondary power source 108 to recover shaft speed despite shaft 104 being above the minimum speed threshold Controller 150 in conjunction with secondary power source 108 can indirectly compensate for excessive loads 102 and/or unexpected conditions affecting load 102 and/or primary power source 106. Controller 150 can assist driveline assembly 100 where load 102 exceeds the maximum load capacity of primary power source 106. More specifically, primary power source 106 can maintain a constant power output as controller 150 interacts with secondary power source 108 to recover lost shaft speed. To this end, controller 150 can adjust the power output of secondary power source 108 exclusively without affecting primary power source 106.

Primary power source 106 can therefore operate independently of secondary power source 108 and controller 150, with secondary power source 108 controlling speed recovery in driveline assembly 100. In the case of primary power source 106 being a gas turbine, controller 150 can recover lost shaft speed via secondary power source 108 without increasing the fuel intake or exhaust temperature of the gas turbine.

Although the present disclosure can be embodied in the form of sensor 120 and controller 150, the present disclosure can also be embodied in the form of different apparatuses. In one example, the present disclosure can include motor 110 of secondary power source 108 being coupled to torque converter 112. As discussed elsewhere herein, torque converter 112 can couple motor 110 to load 102 and gas turbine 106 through rotatable shaft 104 and multiply the power output of motor 110 to rotatable shaft 104. The apparatus can also include controller component 152 within the motor 110. Controller component 152 can be communicatively connected to torque converter 112 such that controller component 152 can adjust the conversion factor of torque converter 112. Controller component 152 can increase the conversion factor of torque converter 112 when the rotational speed of rotatable shaft 104 is less than a minimum speed threshold. Controller component 152 can also carry out all of the functions and processes discussed herein with respect to controller 150. In one example, controller component 152 can increase the conversion factor of torque converter 112 when rotatable shaft 104 rotates more slowly than a predetermined shaft speed set point (yet more quickly than the minimum speed threshold), and when rotatable shaft 104 has a greater deceleration than a deceleration threshold. Embodiments of the present disclosure can therefore prevent rotatable shaft 104 from decelerating too quickly even when rotating above the minimum speed threshold.

Figure 2:
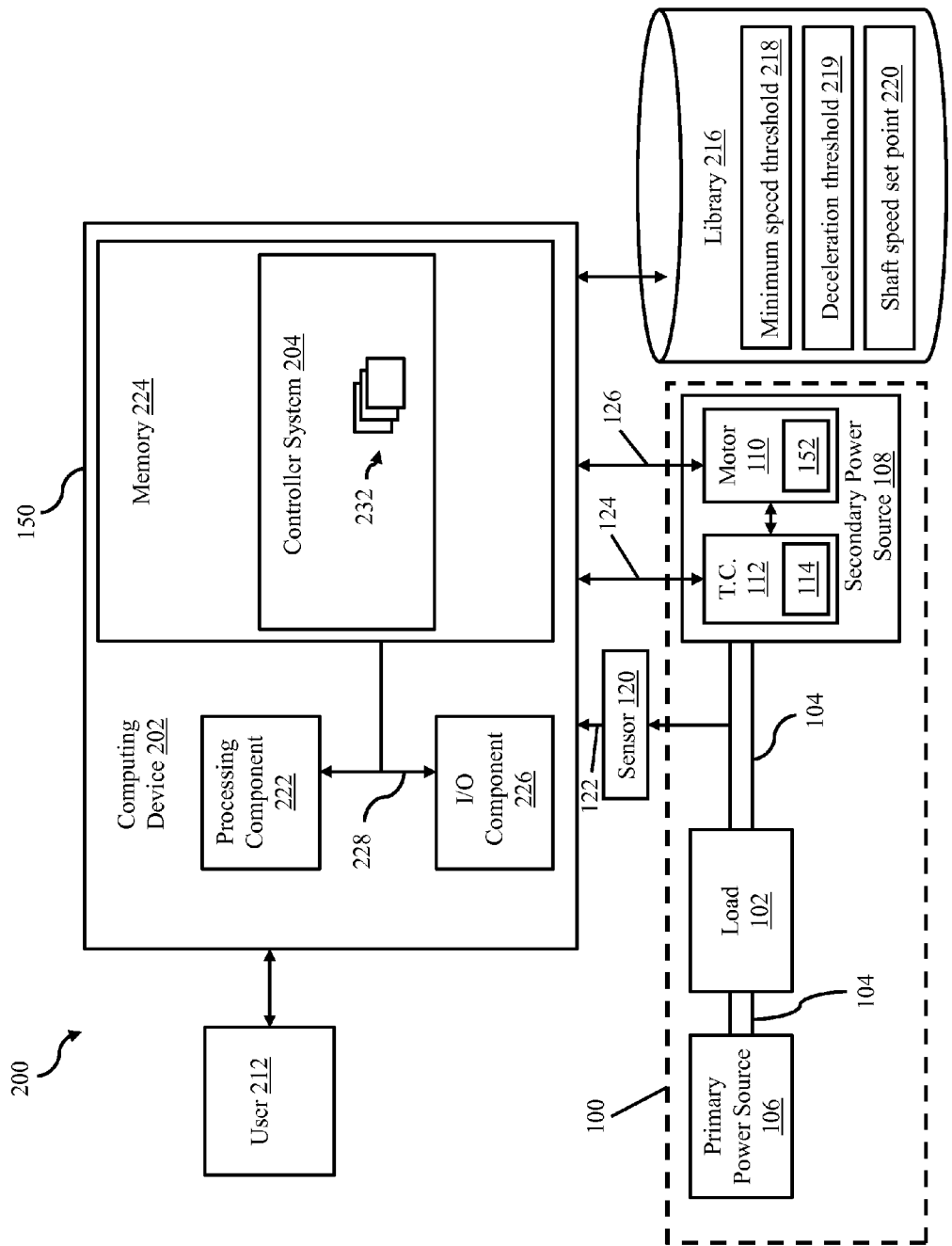
FIG. 2 shows an illustrative environment with a controller coupled to a driveline assembly according to an embodiment of the present disclosure.

Turning to FIG. 2, an illustrative environment 200 according to an embodiment of the present disclosure is shown. Environment 200 can include controller 150, driveline assembly 100, and sensor 120. Although environment 200 includes controller 150 interacting with driveline assembly 100 by way of example, it is understood that controller component 152 (FIG. 1) can include some or all of the same parts as controller 150, may interact with some or all of the components discussed herein, and/or may be part of motor 110. Controller 150 can include a computing device 202 for performing processes described herein to adjust variables such as the power output from secondary power source 108, which in some cases can include adjusting the conversion factor of torque converter (T.C.) 112 during operation. In particular, computing device 202 can include a controller system 204, which allows computing device 202 to adjust components of secondary power source 108 by performing any/all of the processes described herein and implementing any/all of the embodiments described herein.

At least one sensor 120 for measuring rotational velocity can measure the speed of rotatable shaft 104, and can provide these measurements to computing device 202 (e.g., via wireless, hardwire, or other conventional means). Computing device 202 can use measurements from sensor 120 to control aspects of secondary power source 108 and/or torque converter 112 according to processes described herein. Although motor 110 and torque converter 112 are shown by example as being contained entirely within secondary power source 108, motor 110 and torque converter 112 may alternatively be distinct components. Secondary power source 108, in turn, may be operably connected to load 102 and primary power source 106 through rotatable shaft 104. Computing device 202 can adjust secondary power source 108 to recover, preserve, or otherwise control the speed of rotatable shaft 104 in this arrangement. As an example, secondary power source 108 can include motor 110 coupled to torque converter 112 with guide vanes 114 therein. Guide vanes 114 may be opened or closed to adjust the conversion factor and power output from secondary power source 108.

Computing device 202 may communicate with a library 216. In an embodiment, library 216 may include data pertaining to the desired speeds of rotatable shaft 104. Specifically, library 216 can include a minimum speed threshold 218, a deceleration threshold 219, and/or a shaft speed set point 220 for rotatable shaft 104. Minimum speed threshold 218 can represent a minimum speed of rotatable shaft 104 for stable operation of driveline assembly 100 to avoid malfunctions or system failures. Minimum speed threshold 218 can be expressed in terms of any measurement for speed or rotational speed, e.g., meters per second, radians per second, etc. Deceleration threshold 219 can represent the maximum allowable deceleration of rotatable shaft 104 while rotating above minimum speed threshold 218. Thus, deceleration threshold 219 is expressed in terms of an absolute mathematical value, which can be compared to the magnitude or absolute value of any deceleration of rotatable shaft 104. Deceleration threshold can be expressed in terms of meters per second squared, radians per second squared, etc. Rotatable shaft 104 decelerating at a magnitude greater than deceleration threshold 219 can indicate that rotatable shaft 104 will drop below minimum speed threshold 218. Shaft speed set point 220 can be greater than minimum speed threshold 218 and represent an optimum or desired shaft speed of rotatable shaft 104 during operation. More specifically, shaft speed set point 220 can be equal minimum speed threshold 218 added to a predetermined buffer or speed differential for keeping driveline assembly 100 in a stable operating state. Shaft speed set point 220 can be expressed in terms of speed or rotational speed, e.g., in meters per second, radians per second, etc. Although minimum speed threshold 218, deceleration threshold 219, and shaft speed set point 220 are described by example herein, it is understood that library 216 can also include other types of data pertaining to driveline assembly 100 and its components. Furthermore, the data stored within library 216 can additionally or alternatively be stored within controller 150, e.g., within memory 224 discussed herein. Controller system 204 can read data from library 216 and automatically adjust secondary power source 108 (e.g., by changing the set point of motor 110 and/or the conversion factor for torque converter 112) by reference to data obtained from sensor 120. Example steps and processes which controller 150 can perform to adjust secondary power source 108 are shown in the process flow diagram of FIG. 3 and discussed in detail elsewhere herein.

Minimum speed threshold 218, deceleration threshold 219, and/or shaft speed set point 220 may be stored within library 216 as any conventional form of data. That is, data included in library 216 may define a mathematical relationship between the speed of rotatable shaft 104, the characteristics of load 102, and/or the power output from primary and secondary power sources 106, 108. This data may be represented or embodied in a variety of conventional data forms including, but not limited to, a look-up table, an algorithm, etc.

Computing device 202 is shown by example as including a processing component 222 (e.g., one or more processors), a memory 224 (e.g., a storage hierarchy), an input/output (I/O) component 226 (e.g., one or more I/O interfaces and/or devices), and a communications pathway 228. In general, processing component 222 executes program code, such as controller system 204, which is at least partially fixed in memory 224. While executing program code, processing component 222 can process data, which can result in reading and/or writing transformed data from/to memory 224 and/or I/O component 226 for further processing. Communications pathway 228 provides a communications link between each of the components in computing device 202. I/O component 226 can comprise one or more human I/O devices, which enable a human user 212 (e.g., an operator of driveline assembly 100) to interact with computing device 202 and/or one or more communications devices to enable a system user 212 to communicate with computing device 202 using any type of communications link. To this extent, controller system 204 can manage a set of interfaces (e.g., graphical user interface(s), application program interface, etc.) that enable human and/or system users 212 to interact with controller system 204. Further, controller system 204 can manage (e.g., store, retrieve, create, manipulate, organize, present, etc.) data in memory 224, such as determined shaft speeds, shaft decelerations, and/or power outputs using any solution. More specifically, controller system 204 can store various types of data in library 216 as described herein.

In any event, computing device 202 can comprise one or more general purpose computing articles of manufacture (e.g., computing devices) capable of executing program code, such as controller system 204, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the controller system 204 can be embodied as any combination of system software and/or application software.

Further, controller system 204 can be implemented using a set of modules 232. In this case, each module 232 can enable computing device 202 to perform one or more tasks used by controller system 204, and can be separately developed and/or implemented apart from other portions of controller system 204. As used herein, the term "module" means program code that enables computing device 202 to implement the functionality described in conjunction therewith using any solution. For example, a "module" can include a comparator, a calculator, a determinator, a control algorithm, a timer, a data converter, etc. When fixed in a memory 224 of computing device 202 that includes a processing component 222, each module 232 is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computing device 202.

For computing devices 202 made up of multiple computing devices, each of the multiple computing devices may have only a portion of controller system 204 fixed thereon (e.g., one or more modules 232). However, it is understood that computing device 202 and controller system 204 are only representative of various possible equivalent computer systems that may perform a process described herein. To this extent, in other embodiments, the functionality provided by computing device 202 and controller system 204 can be at least partially implemented by one or more computing devices that include any combination of general and/or specific purpose hardware with or without program code. In each embodiment, the hardware and program code, if included, can be created using standard engineering and programming techniques, respectively.

When computing device 202 includes multiple computing devices, the multiple computing devices can communicate over any type of communications link. Further, while performing a process described herein, computing device 202 can communicate with one or more other computer systems using any type of communications link. In either case, the communications link can comprise any combination of various types of wired and/or wireless links; comprise any combination of one or more types of networks; and/or use any combination of various types of transmission techniques and protocols.

Computing device 202 can obtain or provide data, such as measurements from sensor 120 and/or reference data in library 216, using any solution. For example, computing device 202 can obtain and/or retrieve measurements of shaft speed from sensor 120, one or more data stores, or another independent or dependent system. In some embodiments, computing device 202 can also send various pieces of data to other systems.

While shown and described herein as a system for recovering shaft speed in a driveline assembly, it is understood that aspects of the invention further provide various alternative embodiments. For example, in one embodiment, the invention provides a computer program fixed in at least one computer-readable medium, which when executed, enables a computer system to recover and/or control shaft speed in driveline assembly 100. To this extent, the computer-readable medium includes program code, such as controller system 204, which implements some or all of the processes and/or embodiments described herein. It is understood that the term "computer-readable storage medium" comprises one or more of any type of non-transitory or tangible medium of expression, now known or later developed, from which a copy of the program code can be perceived, reproduced, or otherwise communicated by a computing device. For example, the computer-readable storage medium can comprise: one or more portable storage articles of manufacture; one or more memory/storage components of a computing device; paper; etc.

In an embodiment, the invention provides a system for recovering the shaft speed of rotatable shaft 104 by adjusting the power output of secondary power source 110. In this case, a computer system, such as computing device 202, can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

Figure 3:
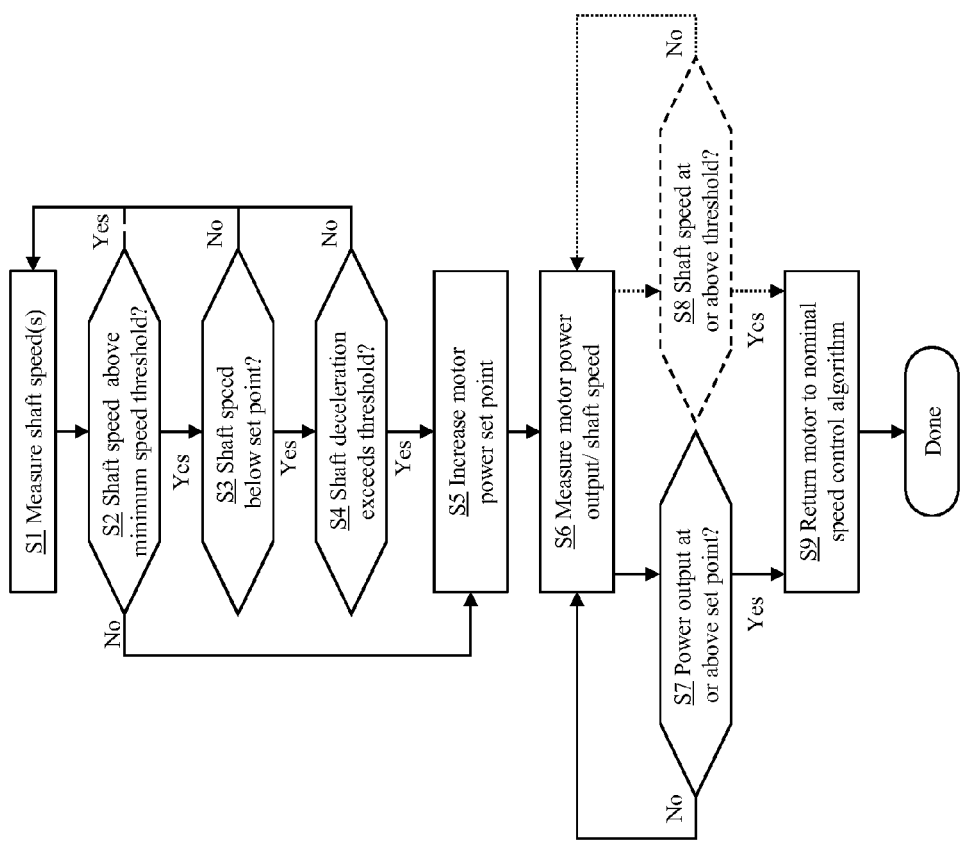
FIG. 3 shows a flow diagram illustrating processes according to embodiments of the present disclosure.

Turning to FIG. 3, an example flow diagram illustrating processes according to embodiments of the invention is shown. The process flow diagram in FIG. 3 is referred to in conjunction with FIG. 2, which illustrates environment 200 for performing the actions described with reference to the process flow of FIG. 3.

In step S1, sensor 120 can measure the shaft speed of rotatable shaft 104. If desired, sensor 120 can measure several values of shaft speed for rotatable shaft 104 at several different times, and/or provide descriptive statistics (average, maximum, minimum values, etc.) over a predetermined period. A data reading or conversion module of controller system 204 can convert the measured shaft speeds from sensor 120 into data. The encoded values of shaft speed can be stored within computing device 202 in memory 224, in library 216, or by any other currently known or later developed solution for storing data. Measuring several values of shaft speed in step S1 can allow calculator modules of controller system 204 to calculate one or more corresponding values of acceleration or deceleration for rotatable shaft 104.

In step S2, a comparator module can compare a particular shaft speed (e.g., the most recently measured shaft speed) with minimum speed threshold 218 for rotatable shaft 104. As discussed elsewhere herein, minimum speed threshold 218 may be stored within, e.g., library 216 in communication with computing device 202. In the event that the compared shaft speed is less than minimum speed threshold 218 (i.e., "no" at step S2), the method can proceed to other steps for recovering the speed of rotatable shaft 104 (i.e., steps S5-S9). Measured shaft speeds being at or above minimum speed threshold 218 can allow computing device 202 to check for other scenarios in which shaft speed recovery is desired (i.e., steps S3 and S4). In alternative embodiments where a shaft speed is compared only with minimum speed threshold 218 (omitting steps S3, S4), the method can return to step S1 along the corresponding phantom process flow line to continue measuring shaft speed without determining in steps S3 and S4 whether speed recovery is needed for other reasons.

In step S3, a comparator module of computing device 202 can compare the measured shaft speed with shaft speed set point 220. Shaft speed set point 220 set point can be higher than minimum speed threshold 218 and more specifically can be an optimum shaft speed for stable operation of driveline assembly 100. If the measured shaft speed is equal to or above shaft speed set point 220, the method can return to step S1 for measuring other shaft speeds with sensor 120. If the shaft speed is below shaft speed set point 220, however, other conditions may indicate that rotatable shaft 104 should recover speed. In step S4, a calculator module of computing device 202 can calculate the acceleration or deceleration of rotatable shaft 104. An approach for calculating acceleration or deceleration includes measuring the change in the speed of rotatable shaft 104 over a particular period, which can be expressed in terms of meters per second squared or similar units. A comparator module of computing device 202 can compare the measured acceleration or deceleration with deceleration threshold 219. As discussed with reference to FIG. 2, deceleration threshold 219 can be stored as data, e.g., within memory 224 of computing device 202 and/or within library 216. Where rotatable shaft 104 is accelerating, or is decelerating at a magnitude less than deceleration threshold 219, no speed recovery is needed and controller system 204 can return to step S1 for measuring additional shaft speeds. Where the measured shaft deceleration exceeds deceleration threshold 219, controller system 204 can continue to speed recovery steps S5-S9. Thus, computing device 202 in embodiments of the present disclosure can recover the speed of rotatable shaft 104 in cases where the speed of rotatable shaft 104 is above minimum speed threshold 218 but decelerating at an unacceptable rate.

To recover shaft speed, a motor control module of controller system 204 can increase a power set point of secondary power source 108 in step S5. Although secondary power source 108 can be in the form of a number of power production devices, mechanisms, etc., secondary power source 108 is discussed by example herein as being in the form of a motor. A motor can be controlled by software and/or hardware instructions in the form of a motor control algorithm, discussed herein, which may include particular set points, power outputs, modes of operation, etc. Other types of power sources can be used instead of a motor, and can be manipulated according to corresponding actions for controlling the power output of secondary power source 108. Where secondary power source 108 includes motor 110, controller system 204 can increase a power set point of motor 110. One method of increasing the power set point of motor 110 includes converting a motor control algorithm of motor 110 from a nominal speed control mode (for ordinary operation of driveline assembly 100) to a speed recovery mode (operating with an increased set point to recover shaft speed). A motor control algorithm generally refers to a series of steps, calculations, etc. carried out by software or hardware within motor 110 for controlling its consumption of power, fuel, etc. to generate different power outputs. The motor control algorithm can be contained wholly or partially within controller system 204 and/or controller component 152. Secondary power source 108 can additionally or alternatively open guide vanes 114 of torque converter 112 to increase the conversion factor for secondary power source 108. In embodiments where driveline assembly 100 includes gearbox 116, increasing the power set point of secondary power source 108 can also include a motor control module of controller system 204 adjusting inputs to gearbox 116 (e.g., adjusting a gear ratio, etc.).

When controller system 204 increases the power set point of secondary power source 108 in step S5, modules of controller system 204 can evaluate the speed recovery of rotatable shaft 104 by one of several methods. Two methods for determining whether rotatable shaft 104 has fully recovered shaft speed are shown in FIG. 3 and discussed by example herein. Generally, controller system 204 can evaluate whether rotatable shaft 104 has fully recovered lost speed by reference to the output of secondary power source 108 or the speed of rotatable shaft 104. In step S6, sensor 120 can measure or derive the power output of secondary power source 108 and/or the shaft speed of rotatable shaft 104. The power output of secondary power source 108 can be measured directly from data provided from secondary power source 108 (e.g., through data coupling 126) or by derivation from shaft speeds measured with sensor 120 and previous shaft speeds.

In an embodiment where controller system 204 applies speed recovery by reference to the power output of secondary power source 108, a comparator module of controller system 204 in step S7 can compare the power output of secondary power source 108 with the increased set point. In an embodiment, a motor control module of controller system 204 can increase the power set point of secondary power source to its maximum value in step S5. In step S7, the comparator module of controller system 204 can compare the power output of secondary power source 108 with this increased power set point for motor 110. The power output set point being set to its maximum value can indicate whether more speed recovery is needed, as the shaft speed of rotatable shaft 104 will reach or exceed the minimum speed threshold 218 when the power output is maximized. In any case, controller system 204 can continue to measure the power output of secondary power source 108 in step S6 when the power output has not reached its increased set point value. When the power output of secondary power source 108 reaches or exceeds its set point, controller system 204 can perform further steps (i.e., step S9) for returning secondary power source 108 to a nominal speed control algorithm. Tracking speed recovery by reference to the set point of secondary power source 108 can be applicable to load 102 exceeding the capacity of primary power source 106, and periodic speed recovery being needed.

In an alternative embodiment, the speed recovery of rotatable shaft 104 is monitored based on the shaft speed of rotatable shaft 104. A comparator module of controller system 204 can compare the speed of rotatable shaft 104 with minimum speed threshold 218 in step S8. Where the shaft speed of rotatable shaft 104 remains below the minimum speed threshold 218, controller system 204 can return to step S6 to continue monitoring the shaft speed. Where minimum speed threshold 218 is met or exceeded, controller system 204 can continue to further steps for returning power source 108 to its ordinary state of operation. Comparing the speed of rotatable shaft 104 with minimum speed threshold 218 in step S8 may be preferable for short term speed losses, e.g., rotatable shaft 104 losing speed based on environmental issues, system shocks, temporary malfunctions or demand increases, etc.

Controller system 204 in step S9 can set a motor control algorithm to its nominal speed control mode or an equivalent mode for ordinary operation. This mode can return secondary power source 108 to an initial state or power set point after rotatable shaft 104 has recovered the desired amount of speed. Where secondary power source 108 includes torque converter 112, returning to a nominal speed control algorithm in step S9 can include a control module of controller system 204 opening guide vanes 114 to decrease the conversion factor of torque converter 112. Controller system 204 can also adjust gearbox 116 (e.g., issuing coded instructions or mechanical inputs for changing a gear ratio) as an additional or alternative method of adjusting the power output of secondary power source 108. Returning secondary power source 108 to a nominal speed control algorithm may also maintain the power set point of secondary power source 108 while decreasing the conversion factor of torque converter 112. The method can then complete or return to step S1 to continue monitoring the speed of rotatable shaft 104. In a particular embodiment, method steps S1-S9 can be performed in a looping fashion to provide continuous oversight of whether speed recovery is needed in driveline assembly 100.

Technical effects of the embodiments discussed herein include the ability to recover the speed of a rotatable shaft in a driveline assembly, e.g., rotatable shaft 104 of driveline assembly 100. More specifically, the present disclosure allows driveline assemblies to be monitored continuously and for corrective actions to be taken quickly before costly system failures occur. Apparatuses and program products which offer protective speed recovery can avoid unit shutdowns, trips, etc. and thereby reduce the costs of maintaining and repairing a system after an unexpected shutdown. In addition, the apparatuses and program products discussed herein can protect a driveline assembly from some environmental conditions and system malfunctions, which may otherwise impair the efficiency and operation of a driveline assembly. The present invention also allows speed recovery by use of a secondary power source (e.g., a motor) while maintaining the current or optimal operating status of a primary power source (e.g., a gas turbine).

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
   a sensor measuring a shaft speed of a rotatable shaft within a driveline assembly, wherein the driveline assembly includes:
   a load coupled to the rotatable shaft,
   a gas turbine coupled to the load through the rotatable shaft to deliver a first power output to the load, and
   a motor coupled to the load through the rotatable shaft to deliver a second power output to the load, wherein the second power output is less than the first power output; and
   a controller in communication with the motor and the sensor, wherein the controller increases the second power output based on an operating characteristic of the driveline assembly in response to the shaft speed being less than a minimum speed threshold, wherein the operating characteristic of the driveline assembly includes one of a fuel intake of the gas turbine, an exhaust temperature of the gas turbine, and a deceleration of the rotatable shaft.

2. The apparatus of claim 1, wherein the controller is further configured to modify a power set point of the motor.

3. The apparatus of claim 1, wherein the driveline assembly further includes a torque converter coupled to the motor and the rotatable shaft, and the controller further modifies a conversion factor of the torque converter to increase or decrease the second power output.

4. The apparatus of claim 3, wherein the controller modifies the conversion factor by one of opening and closing a plurality of guide vanes of the torque converter.

5. The apparatus of claim 1, wherein the controller is further configured to communicate a speed recovery mode algorithm to the secondary power source to increase the second power output.

6. The apparatus of claim 1, wherein the gas turbine maintains a constant fuel intake and exhaust temperature as the controller increases the second power output.

7. The apparatus of claim 1, wherein the gas turbine maintains a constant first power output as the controller increases the second power output.

8. The apparatus of claim 1, wherein the controller increases the second power output in response to the shaft speed being less than a shaft speed set point and a deceleration of the rotatable shaft exceeding a deceleration threshold, wherein the shaft speed set point is greater than the minimum speed threshold.

9. The apparatus of claim 1, wherein the load comprises a compressor.

10. A program product stored on a computer readable storage medium, the program product operative to recover speed in a driveline assembly when executed, the computer readable storage medium comprising program code for:
    comparing a shaft speed of a rotatable shaft of the driveline assembly with a minimum speed threshold, wherein the rotatable shaft mechanically couples a load to a gas turbine and a motor, the gas turbine delivering a first power output to the load and the motor delivering a second power output to the load less than the first power output; and increasing a set point of the motor based on an operating characteristic of the driveline assembly in response to the shaft speed being less than the minimum speed threshold, wherein the operating characteristic of the driveline assembly includes one of a fuel intake of the gas turbine, an exhaust temperature of the gas turbine, and a deceleration of the rotatable shaft.

11. The program product of claim 10, further comprising program code for:

determining whether the shaft speed is below a shaft speed set point, wherein the shaft speed set point is greater than the minimum speed threshold;

comparing a deceleration of the rotatable shaft with a deceleration threshold; and increasing the set point of the motor in response to the shaft speed being below the shaft speed set point and the deceleration of the rotatable shaft exceeding the deceleration threshold.

12. The program product of claim 10, wherein the increasing of the set point of the motor includes increasing a power set point of the motor.

13. The program product of claim 12, further comprising program code for converting a speed control algorithm of the motor from a speed recovery mode to a speed control mode in response to the second power output reaching the motor power set point.

14. The program product of claim 12, wherein the increasing of the power set point of the motor includes maximizing the power set point of the motor.

15. The program product of claim 12, wherein increasing the power set point of the motor includes converting a control algorithm of the motor from a speed mode to a power mode.

16. The program product of claim 10, further comprising program code for adjusting a guide vane position of a torque converter coupled between the motor and the rotatable shaft in response to the shaft speed being less than the minimum speed threshold.

17. The program product of claim 10, further comprising program code for decreasing the set point of the motor in response to the shaft speed exceeding the minimum speed threshold.

18. An apparatus comprising:

a motor coupled to a torque converter, wherein the torque converter couples the motor to a load and a gas turbine through a rotatable shaft within a driveline assembly, and multiplies a power output of the motor to the rotatable shaft by a conversion factor; and a controller component of the motor in communication with the torque converter, wherein the controller component increases the conversion factor of the torque converter based on an operating characteristic of the driveline assembly in response to a shaft speed of the rotatable shaft being less than a minimum speed threshold, wherein the operating characteristic of the driveline assembly includes one of a fuel intake of the gas turbine, an exhaust temperature of the gas turbine, and a deceleration of the rotatable shaft.

19. The apparatus of claim 18, wherein the controller component of the motor increases the conversion factor in response to the shaft speed being less than a shaft speed set point and a deceleration of the rotatable shaft exceeding a deceleration threshold, wherein the shaft speed set point is greater than the minimum speed threshold.

* * * * *